(12) United States Patent
Brousseau et al.

(10) Patent No.: US 7,874,668 B2
(45) Date of Patent: Jan. 25, 2011

(54) EYEGLASSES WITH INTERCHANGEABLE NOSE PAD

(76) Inventors: Guy Brousseau, 118, Claire, St-Jean sur Richelleu, Quebec (CA) J2W 2S9; Louis-Martin Beausejour, 130, Claire, St-Jean sur Richelieu, Quebec (CA) J2W 2S9

( * ) Notice: Subject to any disclaimer, the term of this patent is extended or adjusted under 35 U.S.C. 154(b) by 0 days.

(21) Appl. No.: 12/451,552

(22) PCT Filed: May 20, 2008

(86) PCT No.: PCT/CA2008/000961
§ 371 (c)(1), (2), (4) Date: Nov. 18, 2009

(87) PCT Pub. No.: WO2008/141445
PCT Pub. Date: Nov. 27, 2008

(65) Prior Publication Data
US 2010/0118257 A1    May 13, 2010

(51) Int. Cl.
*G02C 11/02* (2006.01)
*G02C 1/00* (2006.01)
(52) U.S. Cl. .............................. 351/52; 351/83; 351/88; 351/138
(58) Field of Classification Search .................... 351/41, 351/51, 52, 83–88, 111, 119, 121, 136–139
See application file for complete search history.

(56) References Cited
U.S. PATENT DOCUMENTS
4,896,955 A * 1/1990 Zider et al. .................. 351/41
5,646,707 A * 7/1997 Arnette ....................... 351/138
7,261,409 B1   8/2007 Taber
7,467,866 B2 * 12/2008 Chao .......................... 351/52

* cited by examiner

*Primary Examiner*—Huy K Mai (57) ABSTRACT

An eyeglass frame (10), the eyeglass frame (10) being usable for supporting a first lens (12) and a second lens (14), the eyeglass frame (10) comprising: a first rim (16) and a second rim (18), the first and second rims (16 and 18) being provided for supporting respectively the first and second lenses (12 and 14); a bridge (19) attaching the first and second rims (16 and 18) to each other; and a nose pad (20) removably attachable to the first rim (16); the first rim (16) defining a nose pad attachment (24) for removably attaching the nose pad (24) thereto, the nose pad attachment (24) being deformable between a locked configuration in which the nose pad (20) is fixedly attached to the nose pad attachment (24) and an unlocked configuration in which the nose pad (20) is movable relative to the nose pad attachment (24) for selectively attaching the nose pad (20) to the nose pad attachment (24) and detaching the nose pad (20) from the nose pad attachment (24); the first rim (16) being deformable between a lens supporting configuration in which the first rim (16) is able to support the first lens (12) and a deformed configuration, the deformed configuration being achievable when the first rim (16) is deprived of the first lens (16); wherein when the first rim (16) is in the lens supporting configuration, the nose pad attachment (24) is in the locked configuration and when the first rim (16) is in the deformed configuration, the nose pad attachment (24) is in the unlocked configuration.

23 Claims, 8 Drawing Sheets

EYEGLASSES WITH INTERCHANGEABLE NOSE PAD

FIELD OF THE INVENTION

The present invention relates to eyeglasses. More specifically, the present invention is concerned with eyeglasses with interchangeable nose pads.

BACKGROUND

There are many types of eyeglasses having interchangeable side arms. In some of these eyeglasses, the side arms can be changed so as to provide different aesthetic aspects such as, for example, changing the colour of the side arm. Typically, these side arms are exchanged by snapping them in and out of place as they are removably attached to an attachment either extending from a lens of the eyeglasses, in the case of rimless eyeglasses, or from the frame of the eyeglasses, in the case of rimmed eyeglasses. A disadvantage of this type of side arms is that there is a need to change a relatively large component, the whole side arm, to change the appearance of the eyeglasses. Therefore, these side arms, which must be stored separately from the eyeglasses, are relatively cumbersome to carry efficiently by an intended user.

Furthermore, after a few tens or hundreds of side arm exchanges, the side arms and the part of the eyeglasses to which they attach can wear out and, therefore, provide for a relatively non-secure attachment of the side arms to the eyeglasses. This may lead to the side arms being relatively easily detached from the rest of the eyeglasses during normal use, which may eventually lead to the eyeglasses falling on the ground and getting damaged.

Furthermore, there are many eyeglasses including replaceable nose pads. However, these systems typically use nose pads having different dimensions so that the nose pads may be adjusted to the facial features of an intended user of the eyeglasses. This necessitates stores to carry many different sizes of nose pads so that each pair of eyeglasses may be fitted to an intended user. Also, such nose pads either typically include a metallic piece which may be deformed to finely adjust the nose pads to the face of the intended user, or are made out of a polymer which is relatively difficult to deform. In this latter case, it is relatively difficult to perfectly fit the eyeglasses to the intended user. Also, existing detachable nose pads are typically either firmly attachable to the remainder of the eyeglass frame, in which case they are relatively difficult to remove, or relatively loosely attached to the eyeglass frame, in which case they risk being accidentally removed from the eyeglass frame.

Against this background, there exist a need for a new and improved eyeglasses that avoids the aforementioned disadvantages.

SUMMARY OF THE INVENTION

In a broad aspect, the invention provides an eyeglass frame, the eyeglass frame being usable for supporting a first lens and a second lens, the eyeglass frame comprising: a first rim and a second rim, the first and second rims being provided for supporting respectively the first and second lenses; a bridge attaching the first and second rims to each other; and a nose pad removably attachable to the first rim; the first rim defining a nose pad attachment for removably attaching the nose pad thereto, the nose pad attachment being deformable between a locked configuration in which the nose pad is fixedly attached to the nose pad attachment and an unlocked configuration in which the nose pad is movable relative to the nose pad attachment for selectively attaching the nose pad to the nose pad attachment and detaching the nose pad from the nose pad attachment; the first rim being deformable between a lens supporting configuration in which the first rim is able to support the first lens and a deformed configuration, the deformed configuration being achievable when the first rim is deprived of the first lens; wherein when the first rim is in the lens supporting configuration, the nose pad attachment is in the locked configuration and when the first rim is in the deformed configuration, the nose pad attachment is in the unlocked configuration.

The proposed eyeglass frame facilitates attachment and detachment of the nose pad to and from the first rim while ensuring that in use, accidental detachment of the nose pad is unlikely.

In some embodiments of the invention, a decorative insert is provided and is removably insertable into a side arm channel formed in a side arm of the eyeglass frame. In these embodiments, changing the decorative insert for another decorative insert having a different aesthetic appearance allows changing the appearance of the eyeglasses.

Typically, the decorative insert is relatively easily insertable into the side arm channel while being relatively solidly held into the side arm channel so as to reduce the likelihood of accidental detachment of the side arm channel. Furthermore, the insert being relatively small, it is relatively easily carried by intended users of the eyeglass frame.

Advantageously, the proposed eyeglass frame is relatively easily manufactured using known methods and materials.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
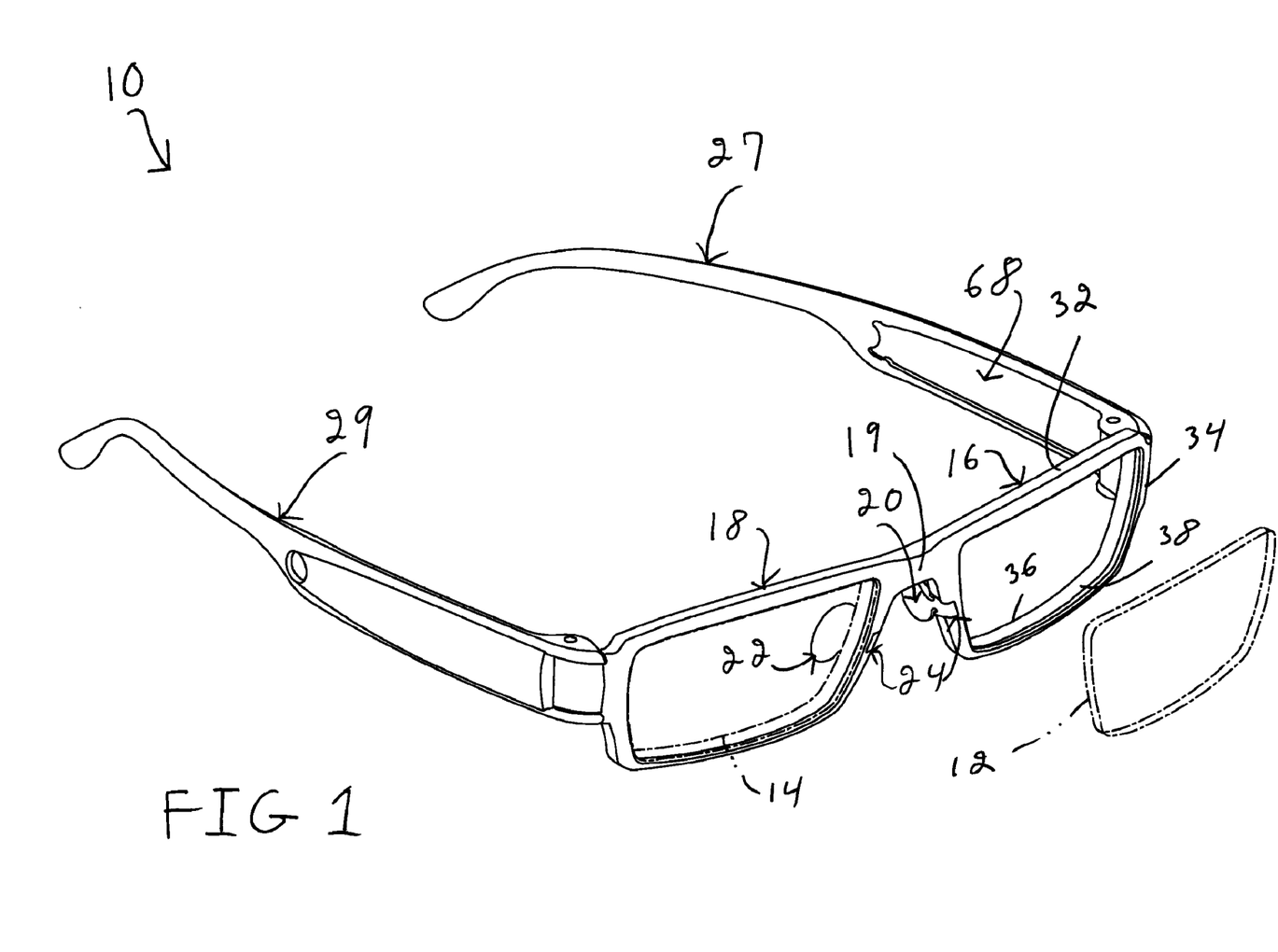
FIG. 1, in a perspective view, illustrates an eyeglass frame in accordance with an embodiment of the invention, the eyeglass frame being usable for supporting a first and a second lens, the first and second lenses being shown in phantom lines.
Figure 2:
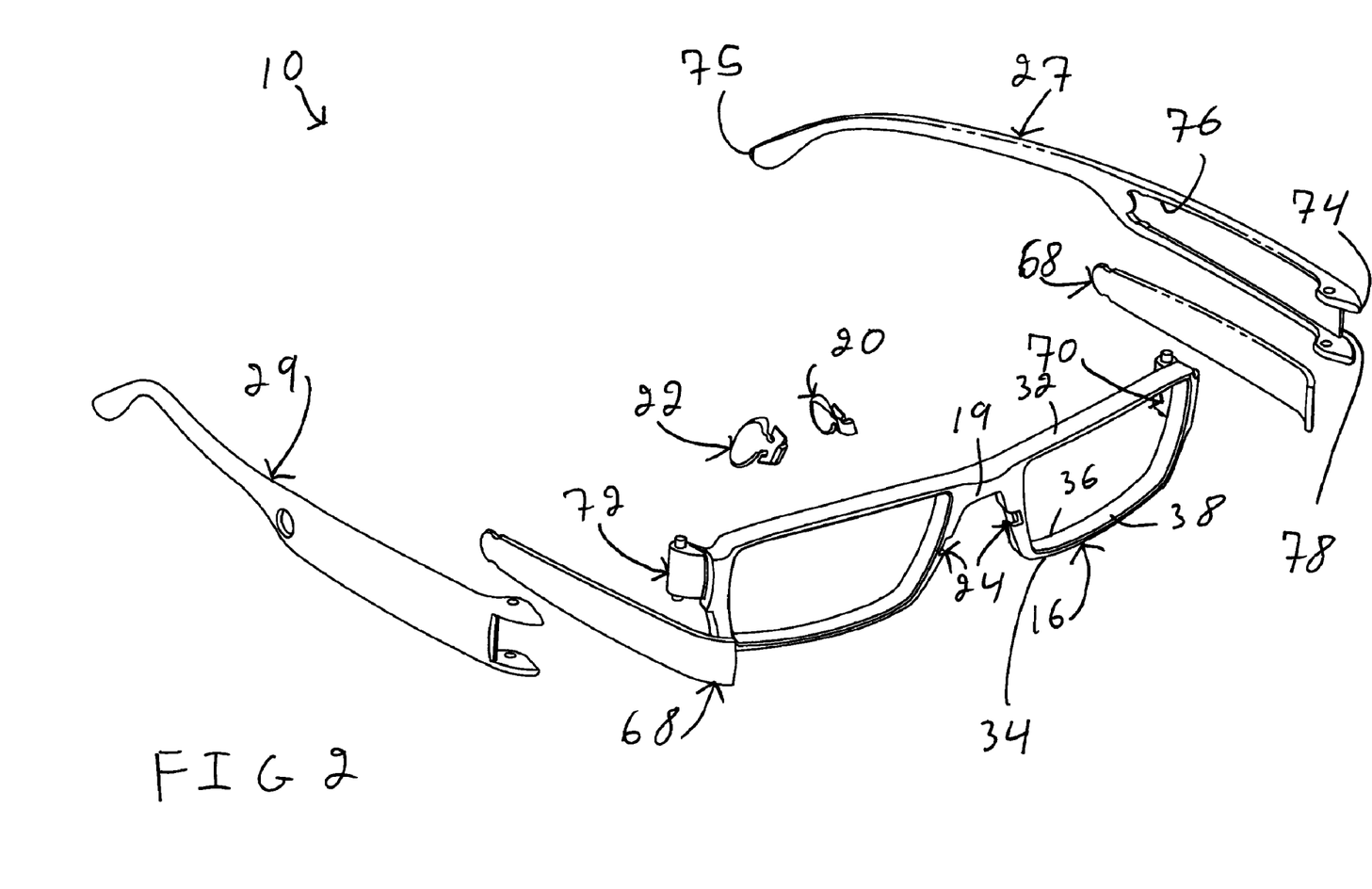
FIG. 2, in an exploded view, illustrates the eyeglass frame of FIG. 1.

Referring to FIGS. 1 and 2, there is shown an eyeglass frame 10 in accordance with an embodiment of the present invention. The eyeglass frame 10 is usable for supporting a first lens 12 and a second lens 14, both shown in phantom lines and only in FIG. 1. The eyeglass frame 10 includes a first rim 16 and a second rim 18. The first and second rims 16 and 18 are provided for supporting respectively the first and second lenses 12 and 14, as shown in FIG. 1. A bridge 19 attaches the first and second rims 16 and 18 to each other. A nose pad 20 is removably attachable to the first rim 16. Also, typically, another nose pad 22 is also removably attachable to the second rim 18. The two nose pads 20 and 22 are substantially similar to each other and the first and second rims 16 and 18 are also substantially similar to each other. Accordingly, hereinbelow, only the first nose pad 20 and the first rim 16 are described in details.

Typically, the eyeglass frame 10 also includes a first side arm 27 and a second side arm 29 both pivotably attached to the remainder of the eyeglass frame 10 in a conventional manner. The two side arms 27 and 29 are substantially similar to each other and only the side arm 27 is described in details hereinbelow.

The first rim 16 defines a nose pad attachment 24 for removably attaching the nose pad 20 thereto. The nose pad attachment 24 is deformable to a locked configuration, as shown for example in FIGS. 5a and 5c, in which the nose pad 20 is fixedly attachable to the nose pad attachment 24. The nose pad attachment 24 is also deformable to an unlocked configuration, as shown for example in FIG. 5b, in which the nose pad 20 is movable relative to the nose pad attachment 24 for selectively attaching the nose pad 20 to the nose pad attachment 24 and detaching the nose pad 20 from the nose pad attachment 24.

Figure 5A:
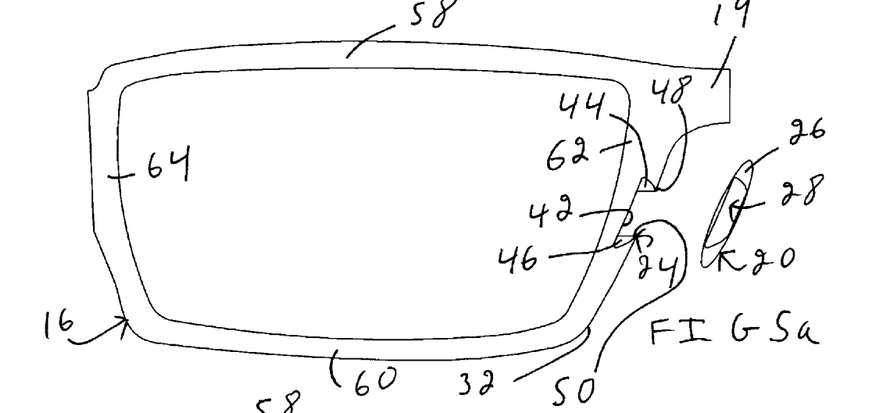
FIG. 5a, in a partial back elevation view, illustrates the eyeglass frame shown in FIGS. 1 to 4c with the nose pad detached from the rim and the eyeglass frame in a lens supporting configuration.
Figure 5B:
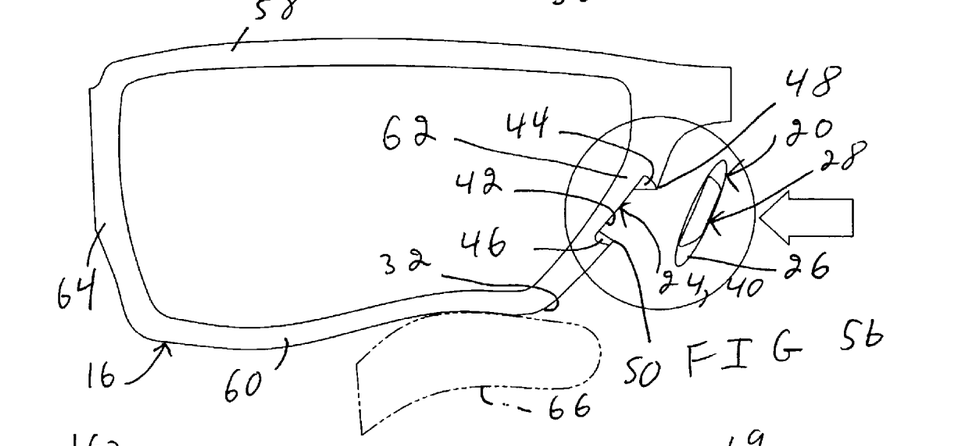
FIG. 5b, in a partial back elevation view, illustrates the eyeglass frame shown in FIGS. 1 to 5a with the nose pad detached from the rim and the eyeglass frame in a deformed configuration.

The first rim 16 is deformable between a lens supporting configuration, as shown for example in FIG. 5a, in which the first rim 16 is able to support the first lens 12, and a deformed configuration, as shown for example in FIG. 5b, the deformed configuration being achievable when the first rim 16 is deprived of the first lens 12. When the first rim 16 is in the lens supporting configuration, the nose pad attachment 24 is in the locked configuration and when the first rim 16 is in the deformed configuration, the nose pad attachment 24 is in the unlocked configuration. As seen for example in FIGS. 3a and 3b, the nose pad 20 defines a pad portion 26 and an attachment portion 28. The attachment portion 28 is removably attachable to the nose pad attachment 24. The pad portion 26 is usable for supporting the eyeglass frame 10 onto the nose of an intended user (both not shown in the drawings). The pad portion 26 is conventional and will therefore not be described in further details.

In some embodiments of the invention, the nose pad 20 includes a deformable portion 30 extending between the pad portion 26 and the attachment portion 28. The deformable portion 30 is typically deformable about three substantially orthogonal axes for allowing the pad portion 26 to move relative to the attachment portion 28 in every direction. This capability to accommodate relative movements between the pad portion 26 and the attachment portion 28 allows for adjustments of the nose pad 20 to the morphology of the intended user. In some embodiments of the invention, deformable portion 30 includes a nose pad neck 31 located between the attachment and pad portions 28 and 26. The nose pad neck 31 is a section of the nose pad 20 that is substantially thinned out relative to the pad portion 26 and the attachment portion 28.

The deformable portion 30 is typically dimensioned and made out of a material such that the deformable portion 30 is deformable over a relatively large number of deformations cycles and over a relatively large range without experiencing fatigue failure. For example, in some embodiments of the invention, the deformable portion 30 has dimensions of from about 0.5 to about 3 mm in directions substantially perpendicular to a direction leading from pad portion 26 toward the attachment portion 28 and is made out of Grivory EMS Grilamid, TR-90 or a similar material.

Figure 6A:
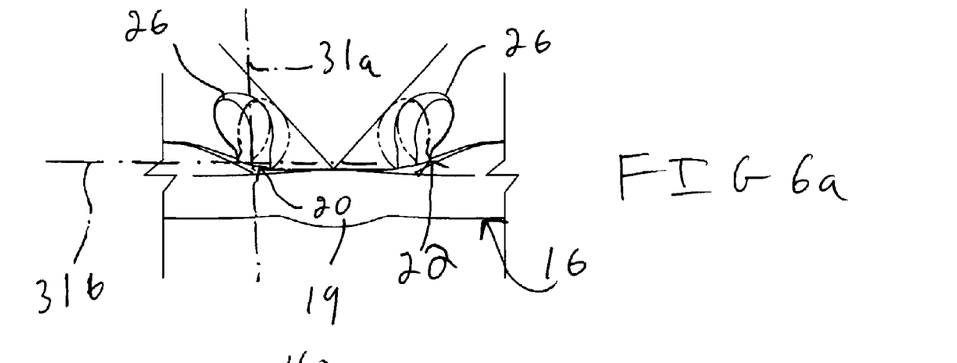
FIG. 6a, in a partial top elevation view, illustrates the nose pad of the eyeglass frame shown in FIGS. 1 to 5c, the nose pad being shown in two different configurations.
Figure 6B:
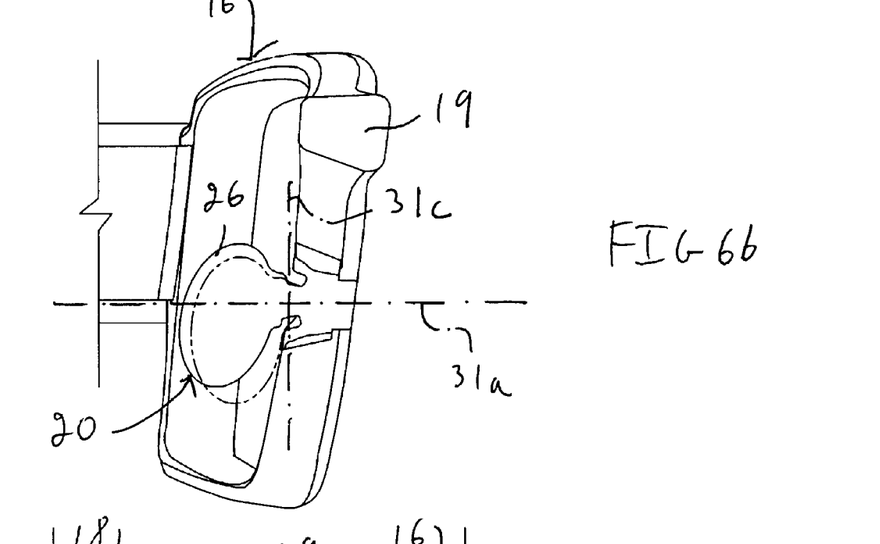
FIG. 6b, in a partial side cross-sectional view, illustrates the nose pad of the eyeglass frame shown in FIGS. 1 to 6a, the nose pad being shown in two different configurations.
Figure 6C:
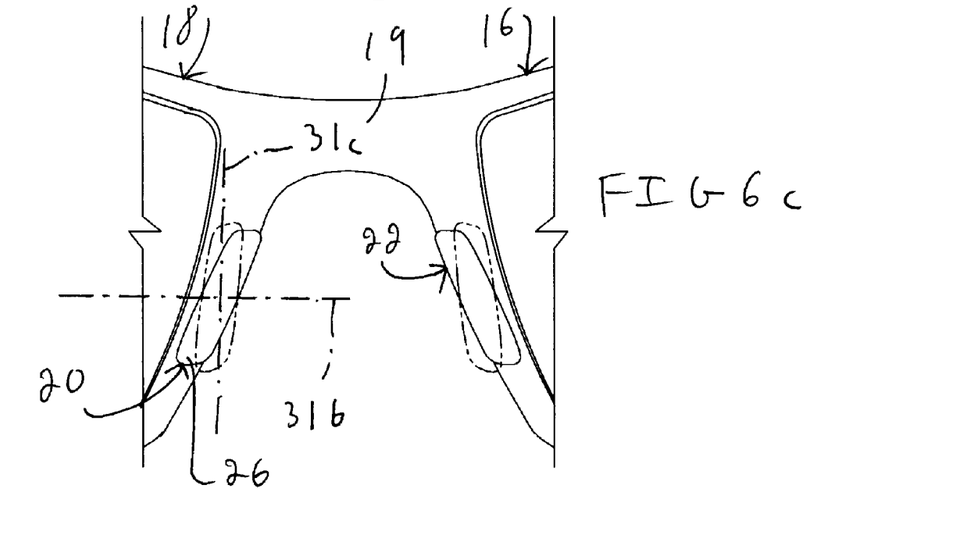
FIG. 6c, in a partial rear elevation view, illustrates the nose pad of the eyeglass frame shown in FIGS. 1 to 6b, the nose pad being shown in two different configurations.

As seen in FIGS. 6a, 6b and 6c, the deformable portion 30 allows for moving the pad portion 26 relatively to the attachment portion 28 and, therefore, to the first rim 12, about three orthogonal axes 31a, 31b and 31c. In FIGS. 6a, 6b and 6c, the pad portion 26 is shown in 2 different positions, one of which is in full lines, and the other one of which is in phantom lines.

Referring to FIG. 2, the first rim 16 defines a first rim peripheral surface 32. In addition, the first rim 16 defines substantially opposed first rim front and back surfaces 34 and 36. The first rim peripheral surface 32 extends between the first rim front and back surfaces 34 and 36. The first rim front surface 34 is further away from the face of the intended user (not shown in the drawings) than the first rim back surface 36 when the eyeglass frame 10 is worn by the intended user in an operative configuration. In addition, the first rim 16 defines a rim inner surface 38 substantially opposed to the first rim peripheral surface 32 and extending between the rim front and back surfaces 34 and 36. Typically, the rim inner surface 38 is configured and sized for fixedly receiving and engaging the first lens 12 in a conventional manner.

Referring to FIG. 5a, the nose pad attachment 24 includes a groove 40 extending substantially radially inwardly into the first rim peripheral surface 32. Typically, the groove 40 is located substantially adjacent the bridge 19 but, in alternative embodiments of the invention, the groove 40 is positioned at any other suitable location.

As better seen in FIGS. 5a and 5b, the groove 40 is delimited by a groove end surface 42 and a pair of substantially circumferentially spaced apart lateral surfaces 44 and 46, each extending substantially radially outwardly from the groove end surface 42. The groove lateral surfaces 42 and 44 taper toward each other in a direction leading substantially away from the groove end surface 42 when the nose pad attachment 24 is in the locked configuration.

In some embodiments of the invention, the groove lateral surfaces 44 and 46 each define a respective groove lateral surface distal end 48 and 50 substantially adjacent to the first rim peripheral surface 32. The groove lateral surface distal ends 48 and 50 are spaced apart by a greater distance in the unlocked configuration than in the locked configuration. In some embodiments of the invention, the groove lateral surfaces 44 and 46 are substantially parallel to each other when the nose pad attachment 24 is in the unlocked configuration, as seen in FIG. 5b.

Figure 3A:
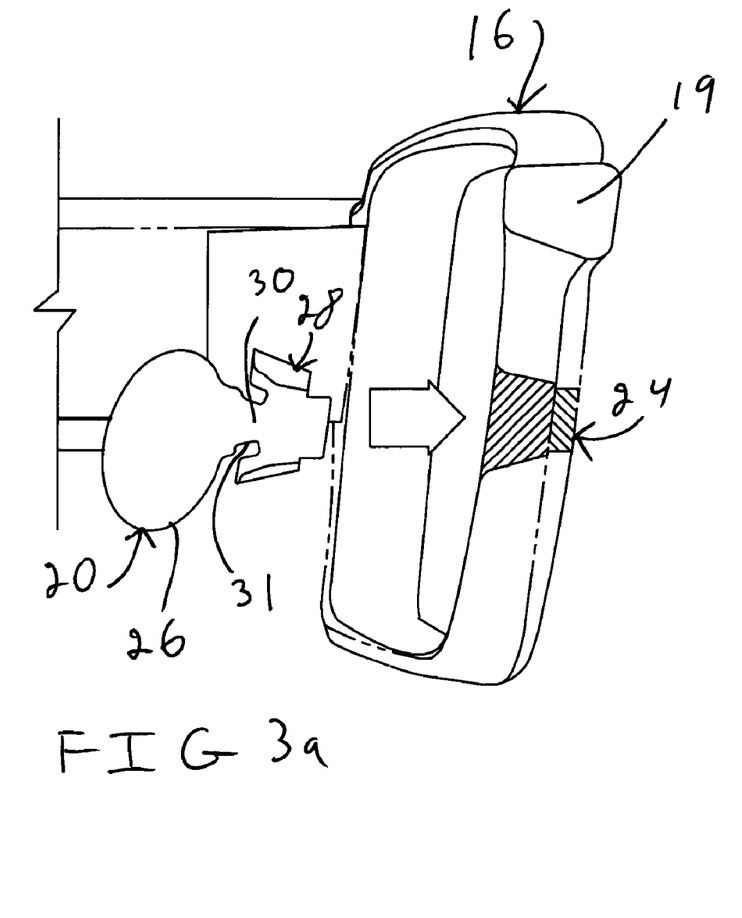
FIG. 3a, in a partial side cross-sectional view, illustrates the eyeglass frame of FIGS. 1 and 2, the eyeglass frame including a rim and a nose pad, the eyeglass frame being shown with the nose pad detached from the rim.
Figure 3B:
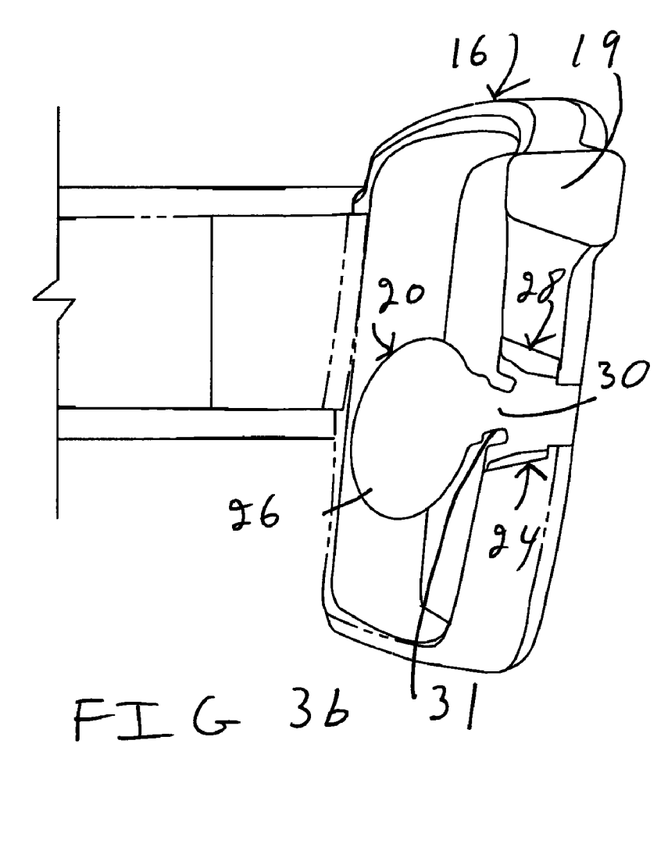
FIG. 3b, in a partial side cross-sectional view, illustrates the eyeglass frame of FIGS. 1 to 3a with the nose pad shown attached to the rim.
Figure 4A:
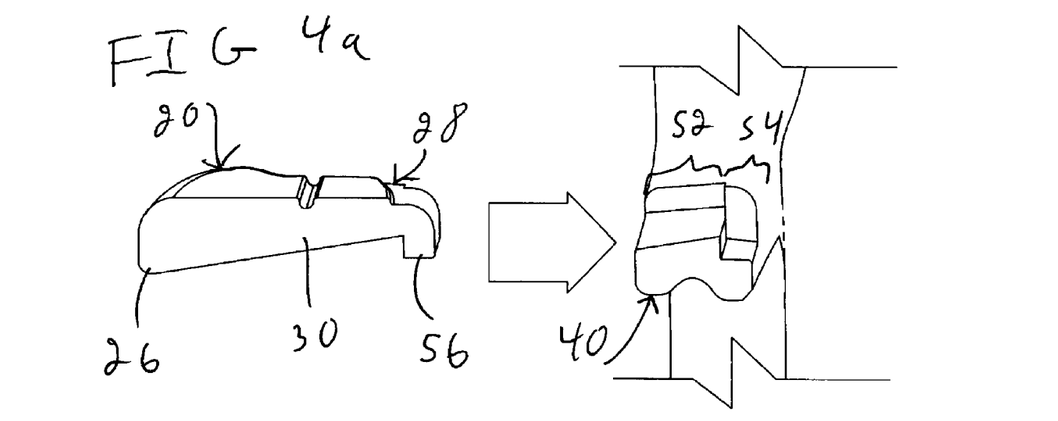
FIG. 4a, in a bottom cross-sectional view, illustrates the eyeglass frame of FIGS. 1 to 3b, the eyeglass frame being shown with the nose pad detached from the rim.
Figure 4B:
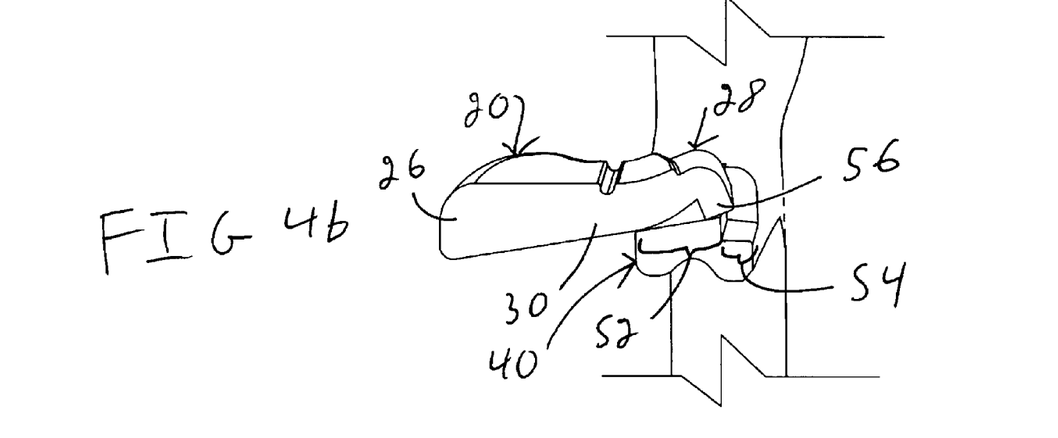
FIG. 4b, in a bottom cross-sectional view, illustrates the eyeglass frame shown in FIGS. 1 to 4a with the nose pad in the process of being attached to the rim.

In some embodiments, as seen for example in FIG. 4a, the groove 40 defines a groove first section 52 and an axially extending groove second section 54. The groove second section 54 extends radially inwardly into the first rim peripheral surface 32 over a greater extent than the groove first section 52. As seen in FIG. 3a. in some embodiments of the invention, the groove first and second lateral surfaces 44 and 46 are tapered towards each in a direction leading from the groove first section 52 towards the groove second section 54. Typically, to improve the aesthetics of the eyeglass frame 10, the groove first section 52 is located substantially adjacent the first rim back surface 36.

Figure 5C:
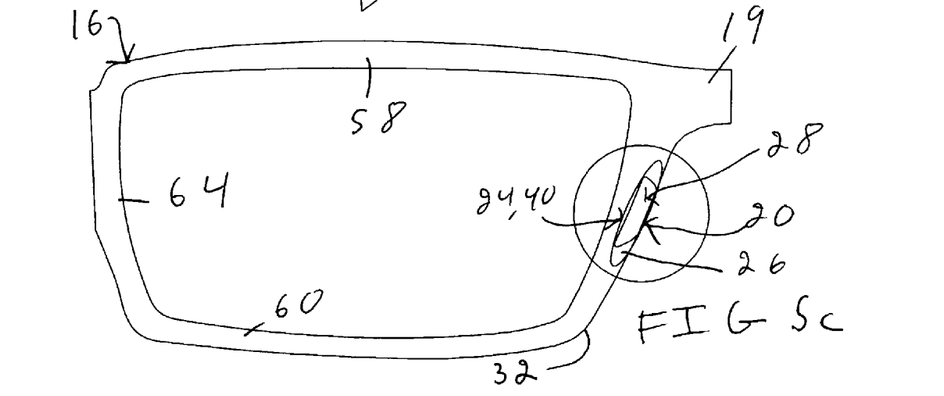
FIG. 5c, in a partial back elevation view, illustrates the eyeglass frame shown in FIGS. 1 to 5b with the nose pad attached to the rim and the eyeglass frame in the lens supporting configuration.

Typically, a section of the attachment portion 28 that is received inside the groove 40 when the nose pad 20 is attached to the first rim 16 is shaped substantially similarly to the groove 40 so as to be maintained thereinto by the groove end and lateral surfaces 42, 44 and 46 (seen in FIGS. 5a, 5b and 5c). Accordingly, as seen for example in FIG. 4a. the attachment portion 28 is provided with a distal tongue 56 dimensioned for engaging the groove 40 into the groove second section 54.

In some embodiments of the invention, the attachment portion 28 is substantially resiliently deformable for allowing insertion of the attachment portion 28 substantially axially into the groove 40 without deforming necessarily the groove 40 so that the nose pad attachment 24 is in the unlocked configuration. However, because of the tongue 56, the reverse movement, in other words, detachment of the nose pad 20 from the remainder of the rim 16, is unlikely to happen without outside intervention. In these embodiments, this provides an alternative manner of attaching the nose pad 20 to the first rim 16 that is achievable even if the first lens 12 is received by the first rim 16.

With reference to FIGS. 5a to 5c, the first rim 16 defines substantially opposed first rim top and bottom segments 58 and 60 and substantially opposed rim lateral segments 62 and 64 each extending between the first rim top and bottom segments 58 and 60. The groove 40 is formed in one of the rim lateral segments, namely rim lateral segment 62. As seen in FIG. 5b, in the deformed configuration, the first rim top and bottom segments 58 and 60 are deformed towards each other.

In some embodiments of the invention, the nose pad 20 is substantially freely movable relative to the nose pad attachment 24 when the nose pad attachment 24 is in the unlocked configuration. For example, the nose pad 20 is substantially radially freely movable relative to the nose pad attachment 24 when the nose pad attachment 24 is in the unlocked configuration.

Figure 4C:
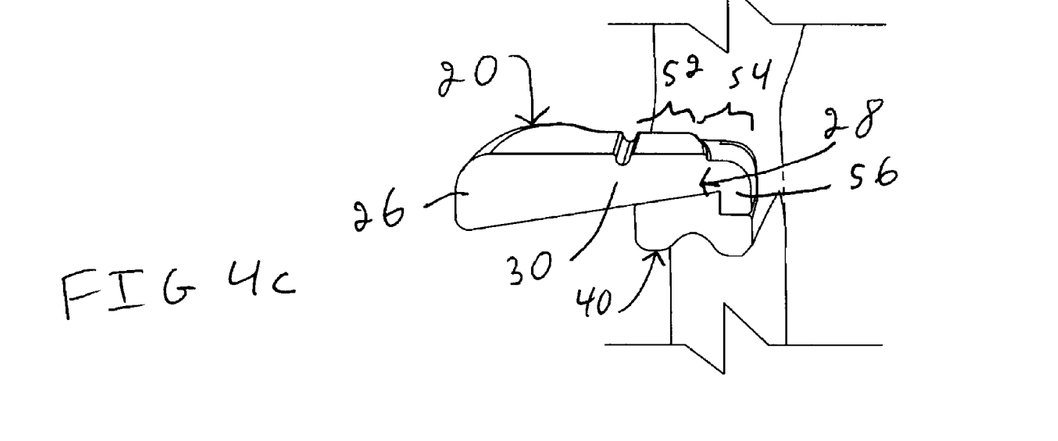
FIG. 4c, in a bottom cross-sectional view, illustrates the eyeglass frame shown in FIGS. 1 to 4b, the eyeglass frame being shown with the nose pad attached to the rim.

In use, with reference to FIGS. 5a to 5c, to insert the nose pad 20 in the groove 40, an intended user typically uses a finger 66, shown in FIG. 5b, to deform one of the first rim top and bottom segments 58 and 60, or to deform both the first rim top and bottom segments 58 and 60 towards each other. This creates a strain in the first rim peripheral surface 32, which pulls apart from each other the groove lateral surface distal ends 48 and 50. In turn, this movement allows for inserting relatively easily the attachment portion 28 inside the groove 40. After having released the rim 16, the nose pad attachment 24 recovers the locked configuration and the nose pad 20 is prevented from moving out of the groove 40 by the tapered configuration in two different directions of the groove lateral surfaces 44 and 46 and by the tongue 56, as seen for example in FIG. 4c.

In some embodiments of the invention, the eyeglass frame 10 includes a decorative insert 68 and the first side arm 27 defines an insert attachment for removably attaching the decorative insert 68 thereto. Typically, the second side arm 29 also defines an insert attachment for attaching a similar decorative insert 68 thereto.

Figures 7A, 7B, 7C:
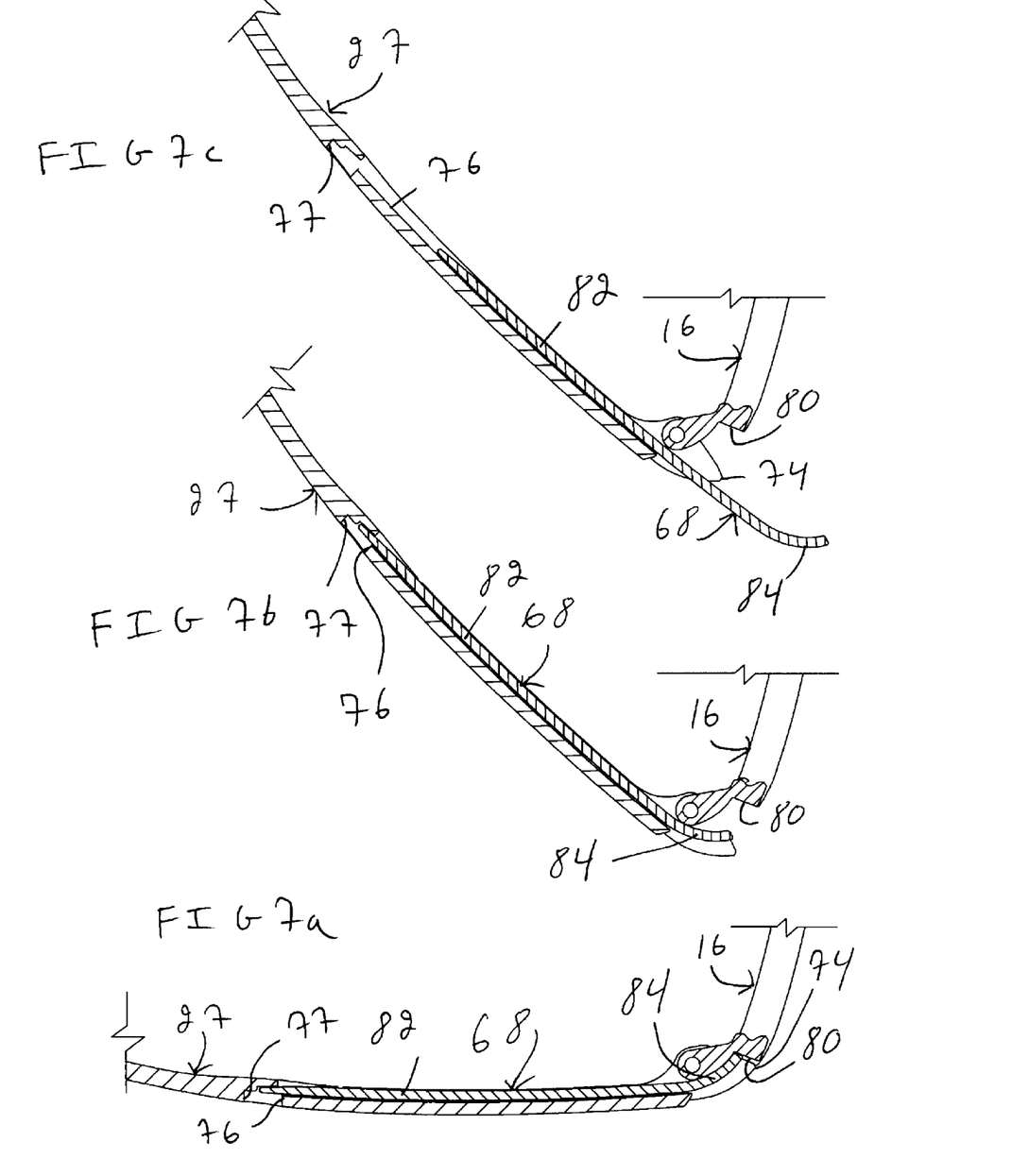
FIG. 7a, in a partial bottom cross-sectional view, illustrates the eyeglass frame shown in FIGS. 1 to 6c, the eyeglass frame being shown with a side arm thereof in an extended position and an insert inserted into a side arm channel defined by the side arm.
FIG. 7b, in a partial bottom cross-sectional view, illustrates the eyeglass frame shown in FIGS. 1 to 7a, the eyeglass frame being shown with a side arm thereof in a retracted position and the insert inserted into the side arm channel.
FIG. 7c, in a partial bottom cross-sectional view, illustrates the eyeglass frame shown in FIGS. 1 to 7b, the eyeglass frame being shown with a side arm thereof in an extended position and the insert partially removed from the side arm channel.

The eyeglass frame 10 also includes a first side arm attachment 70 and a second side arm attachment 72 respectively mechanically coupled to the first and second rims 16 and 18 and respectively to the first and second side arms 27 and 29 for allowing pivotal movement of the first and second side arms 27 and 29 relative to the first and second rims 16 and 18. Typically, the side arm attachments 70 and 72 extend substantially laterally outwardly from the rims 16 and 18 such that the side arms 27 and 29 are attached to locations located laterally outside of the lenses 12 and 14. The first and second side arms 27 and 29 are pivotable relative to the first and second rims 16 and 18 between a retracted position, shown for example in FIG. 7c for the first side arm 27, and an extended position, shown for example in FIG. 7a for the first side arm 27.

The first side arm 27 is substantially elongated and defines a first arm first end 74 and a substantially opposed first arm second end 75, the first arm first end 74 being substantially adjacent to the first side arm attachment 70. The insert attachment includes a first arm channel 76 defined in the first side arm 27 and extending substantially longitudinally thereinto, the first arm channel 76 defining a channel end opening 78 substantially adjacent the first arm first end 74. Typically, the first arm channel 76 has a substantially C-shaped lateral cross-sectional configuration at least along a portion thereof and opens either toward the first rim 16 or away from the first rim 16. The decorative insert 68 is slidably receivable inside the first arm channel 76 through the channel end opening 78. In addition, in some embodiments of the invention, the first side arm 27 defines a channel distal aperture 77 substantially opposed to the channel end opening 78. In some embodiments of the invention, the first side arm is substantially transparent or translucent substantially in register with the first arm channel 76.

The first side arm attachment 70 defines a side arm attachment abutment surface 80. When the decorative insert 68 is inserted in the first arm channel 76, the decorative insert 68 is substantially prevented from sliding out of the first arm channel 76 by the side arm attachment abutment surface 80 when the first side arm 27 is in the extended position. The decorative insert 68 is slidable out of the first arm channel 76 through the channel end opening 78 when the first side arm 27 is in the in the retracted position. For example, in some embodiments of the invention, the decorative insert 68 abuts against the side arm attachment abutment surface 80 when the decorative insert 68 is inserted in the first arm channel 76 and the first side arm 27 is in the extended position. In some embodiments of the invention, it has been found advantageous for facilitating retention of the decorative insert 68 in the first arm channel 76 to have a side arm attachment abutment surface 80 that is substantially planar and angled at an angle of from about 10 to about 85 degrees relative to the first arm channel 76 when the first side arm 27 is in the extended position.

The decorative insert 68 includes a channel insertable portion 82 receivable inside the first arm channel 76 and an end portion 84 positionable outside of the first arm channel 76 with the channel insertable portion 82 received in the first arm channel 76. The end portion 84 has typically a substantially arc segment shaped configuration and extends substantially toward the first rim 16 when the channel insertable portion 82 is inserted in the first arm channel 76 and the first side arm 27 is in the extended position. The shape of the end portion 84, in addition to securing the decorative insert 68 inside the first arm channel 76, facilitates the intentional removal of the decorative insert 68 from the first arm channel 76 by providing grip to the hand and fingers of the intended user.

Figure 8A:
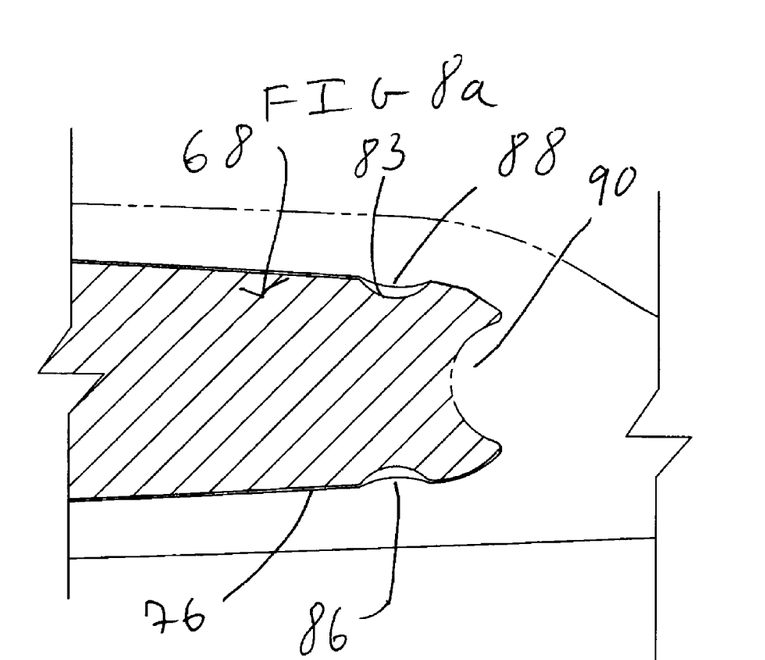
FIG. 8a, in a partial side elevation view, illustrates the side arm channel with the decorative insert partially inserted into the side arm channel.
Figure 8B:
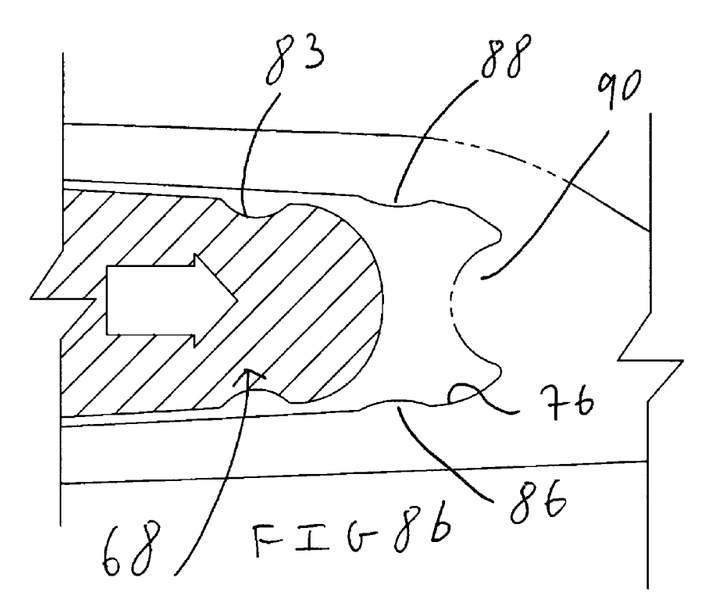
FIG. 8b, in a partial side elevation view, illustrates the side arm channel with the decorative insert completely inserted into the side arm channel.

In some embodiments of the invention, as seen in FIGS. 8a and 8b, the decorative insert 68 defines a neck portion 83 and the first side arm 27 defines pair of protrusions 86 and 88 extending substantially laterally into the first arm channel 76. The protrusions 86 and 88 engage the neck portion 83 when the decorative insert 68 is received inside the first arm channel 76. The protrusions 86 and 88 therefore help in retaining the decorative insert 68 in the first arm channel 76.

In some embodiments of the invention, the first side arm 27 defines a tongue 90 extending substantially longitudinally into the first arm channel 76 substantially opposed to the channel end opening 78. The tongue 90 frictionally engages the decorative insert 68 for frictionally retaining the decorative insert 68 in the first arm channel 76. The channel distal aperture 77 is located substantially in register with the tongue 90 and receives the distal end of the decorative insert 68.

In use, to manipulate the decorative inserts 68, the side arms 27 and 29 are moved to their respective retracted configuration so that a respective decorative insert 68 can be slidably inserted thereinto. The decorative inserts 68 are typically relatively easily removable from the side arm channel 76 to facilitate their exchange with decorative inserts 68 providing a different decoration.

Although the present invention has been described hereinabove by way of preferred embodiments thereof, it can be modified, without departing from the spirit and nature of the subject invention as defined in the appended claims.

What is claimed is:

1. An eyeglass frame, said eyeglass frame being usable for supporting a first lens and a second lens, said eyeglass frame comprising:
   a first rim and a second rim, said first and second rims being provided for supporting respectively said first and second lenses;
   a bridge attaching said first and second rims to each other; and
   a nose pad removably attachable to said first rim;
   said first rim defining a nose pad attachment for removably attaching said nose pad thereto, said nose pad attachment being deformable between a locked configuration in which said nose pad is fixedly attached to said nose pad attachment and an unlocked configuration in which said nose pad is movable relative to said nose pad attachment for selectively attaching said nose pad to said nose pad attachment and detaching said nose pad from said nose pad attachment;
   said first rim being deformable between a lens supporting configuration in which said first rim is able to support said first lens and a deformed configuration, said deformed configuration being achievable when said first rim is deprived of said first lens;
   wherein, when said first rim is in said lens supporting configuration, said nose pad attachment is in said locked configuration and when said first rim is in said deformed configuration, said nose pad attachment is in said unlocked configuration.

2. An eyeglasses frame as defined in claim 1, wherein said nose pad defines a pad portion and an attachment portion, said attachment portion being removably attachable to said nose pad attachment.

3. An eyeglass frame as defined in claim 2, wherein said nose pad attachment includes a groove for receiving said attachment portion thereinto.

4. An eyeglass frame as defined in claim 3, wherein said first rim defines a first rim peripheral surface, said groove extending substantially radially inwardly into said first rim peripheral surface.

5. An eyeglass frame as defined in claim 4, wherein said groove is delimited by a groove end surface and a pair of substantially circumferentially spaced apart groove lateral surfaces extending substantially radially outwardly from said groove end surface, said groove lateral surfaces tapering towards each other in a direction leading substantially away from said groove end surface when said nose pad attachment is in said locked configuration.

6. An eyeglass frame as defined in claim 5, wherein said groove lateral surfaces each define a respective groove lateral surface distal end substantially adjacent to said rim peripheral surface, said groove lateral surface distal ends being spaced apart from each other by a greater distance in said unlocked configuration than in said locked configuration.

7. An eyeglass frame as defined in claim 6, wherein said groove lateral surfaces are substantially parallel to each other when said nose pad attachment is in said unlocked configuration.

8. An eyeglass frame as defined in claim 5, said eyeglass frame being wearable by an intended user having a face, wherein said first rim defines substantially opposed first rim front and back surfaces, said first rim peripheral surface extending between said first rim front and back surfaces, said first rim front surface being further away from said face than said first rim back surface when said eyeglass frame is worn by said intended user in an operative configuration, said groove extending from said rim back surface to said rim front surface.

9. An eyeglass frame as defined in claim 8, wherein said groove defines a groove first section and an axially extending groove second section, said groove second section extending radially inwardly into said first rim peripheral surface over a greater extent than said groove first section.

10. An eyeglass frame as defines in claim 9, wherein said groove first and second lateral surfaces are tapered towards each other in a direction leading from said groove first section towards said groove second section.

11. An eyeglass frame as defined in claim 3, wherein said first rim defines substantially opposed first rim top and bottom segments and two substantially opposed first rim lateral segments extending therebetween, said groove being formed in one of said first rim lateral segments, wherein, when said first rim is deformed from said lens supporting configuration to said deformed configuration, said first rim top and bottom segments are deformed toward each other.

12. An eyeglass frame as defined in claim 2, wherein said nose pad includes a deformable portion extending between said pad portion and said attachment portion, said deformable portion being deformable about 3 orthogonal axes for allowing said pad portion to move relative to said attachment portion.

13. An eyeglass frame as defined in claim 12, wherein said deformable portion includes a nose pad neck located between said attachment and pad portions.

14. An eyeglass frame as defined in claim 1, wherein said nose pad is substantially freely movable relative to said nose pad attachment when said nose pad attachment is in said unlocked configuration.

15. An eyeglass frame as defined in claim 1, further comprising
a decorative insert;
a first side arm, said first side arm defining an insert attachment for removably attaching said decorative insert thereto; and
a first side arm attachment mechanically coupled to said first rim and to said first side arm for allowing pivotal movement of said first side arm relative to said first rim.

16. An eyeglass frame as defined in claim 15, wherein said first side arm is substantially elongated and defines a first arm first end and a substantially opposed first arm second end, said first arm first end being substantially adjacent to said first side arm attachment, said insert attachment including a first arm channel defined in said first side arm and extending substantially longitudinally thereinto, said first arm channel defining a channel end opening substantially adjacent said first arm first end.

17. An eyeglass frame as defined in claim 16, wherein said decorative insert is slidably receivable inside said first arm channel through said channel end opening.

18. An eyeglass frame as defined in claim 17, wherein said first side arm attachment defines a side arm attachment abutment surface, said first side arm being pivotable relative to said first rim between a retracted position and an extended position, wherein, when said decorative insert is inserted in said first arm channel, said decorative insert is substantially prevented from sliding out of said first arm channel by said side arm attachment abutment surface when said first side arm is in said extended position and said decorative insert is slidable out of said first arm channel through said channel end opening when said first side arm is in said in said retracted position.

19. An eyeglass frame as defined in claim 18, wherein said decorative insert abuts against said side arm attachment abutment surface when said decorative insert is inserted in said first arm channel and said first side arm is in said extended position.

20. An eyeglass frame as defined in claim 19, wherein said decorative insert includes a channel insertable portion receivable inside said first arm channel and an end portion positionable outside of said first arm channel with said channel insertable portion received in said first arm channel, said end portion having a substantially arc segment shaped configuration and extending substantially toward said first rim when said channel portion is inserted in said first arm channel and said first side arm is in said extended position.

21. An eyeglass frame as defined in claim 20, wherein said side arm attachment abutment surface is substantially planar and angled at an angle of from about 10 to about 85 degrees relative to said first arm channel when said first side arm is in said extended position.

22. An eyeglass frame as defined in claim 16, wherein said decorative insert defines a neck portion and said first side arm defines a protrusion extending substantially laterally into said first arm channel, said protrusion engaging said neck portion when said decorative insert is received inside said first arm channel.

23. An eyeglass frame as defined in claim 1, wherein said nose pad is substantially radially freely movable relative to said nose pad attachment when said nose pad attachment is in said unlocked configuration.

* * * * *